(12) United States Patent
Holden

(10) Patent No.: US 8,942,255 B2
(45) Date of Patent: Jan. 27, 2015

(54) MANAGING DATA

(75) Inventor: Dan Holden, Englewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 118 days.

(21) Appl. No.: 13/105,009

(22) Filed: May 11, 2011

(65) Prior Publication Data
US 2012/0291063 A1 Nov. 15, 2012

(51) Int. Cl.

| | | |
|---|---|---|
| *H04J 3/16* | (2006.01) | |
| *H04J 3/22* | (2006.01) | |
| *H04H 20/42* | (2008.01) | |
| *H04N 21/236* | (2011.01) | |
| *H04N 21/2385* | (2011.01) | |
| *H04N 21/2389* | (2011.01) | |
| *H04N 21/262* | (2011.01) | |
| *H04N 21/488* | (2011.01) | |
| *H04N 21/643* | (2011.01) | |
| *H04N 21/658* | (2011.01) | |
| *H04N 21/81* | (2011.01) | |
| *H04N 21/84* | (2011.01) | |
| *H04H 20/91* | (2008.01) | |

(52) U.S. Cl.
CPC ......... *H04H 20/42* (2013.01); *H04N 21/23614* (2013.01); *H04N 21/2385* (2013.01); *H04N 21/2389* (2013.01); *H04N 21/262* (2013.01); *H04N 21/4884* (2013.01); *H04N 21/64322* (2013.01); *H04N 21/6582* (2013.01); *H04N 21/812* (2013.01); *H04N 21/84* (2013.01); *H04H 20/91* (2013.01)
USPC ........... 370/468; 370/431; 370/437; 370/477; 725/32; 725/114; 725/116

(58) Field of Classification Search
USPC ............ 370/431, 437, 468, 477; 725/32, 116, 725/114
See application file for complete search history.

(56) References Cited

U.S. PATENT DOCUMENTS

| 6,987,767 B2 * | 1/2006 | Saito ............................. 370/394 |
| 7,203,154 B2 * | 4/2007 | McPherson et al. ........ 369/275.3 |
| 7,669,130 B2 * | 2/2010 | Agarwal et al. ............... 715/723 |
| 7,751,315 B1 * | 7/2010 | Pai et al. ........................ 370/230 |
| 2002/0085584 A1 | 7/2002 | Itawaki et al. |

(Continued)

FOREIGN PATENT DOCUMENTS

| EP | 1326355 A2 | 7/2003 |
| EP | 2268067 A1 | 12/2010 |

OTHER PUBLICATIONS

Extended European Search Report—EP 12166737.2—Mailing date: Sep. 5, 2013.

*Primary Examiner* — Nnenna Ekpo
(74) *Attorney, Agent, or Firm* — Banner & Witcoff, Ltd.

(57) ABSTRACT

An apparatus, method, and system are provided for binding application data associated with an application with content asset data associated with a content asset. In some embodiments, capacity or bandwidth for each of the application data and the content asset data may be allocated in accordance with one or more profiles. The one or more profiles may include horizontal aspects, vertical aspects, linear and non-linear aspects, and the like. In some embodiments, the binding may take place at a content provider location in accordance with early binding practices, at a central location in accordance with late binding practices, and/or at a user equipment device in accordance with user binding practices.

24 Claims, 9 Drawing Sheets

(56) References Cited

U.S. PATENT DOCUMENTS

| | | |
|---|---|---|
| 2002/0194589 A1* | 12/2002 | Cristofalo et al. ............... 725/32 |
| 2005/0030971 A1* | 2/2005 | Yuan ............................. 370/462 |
| 2005/0278761 A1* | 12/2005 | Gonder et al. .................. 725/95 |
| 2007/0130581 A1* | 6/2007 | Del Sesto et al. ............... 725/36 |
| 2010/0172367 A1* | 7/2010 | Foti ............................... 370/431 |
| 2010/0333149 A1* | 12/2010 | Sharma et al. .................. 725/91 |
| 2011/0153863 A1* | 6/2011 | Khan et al. .................... 709/235 |
| 2012/0170501 A1* | 7/2012 | Drozt et al. .................... 370/312 |

* cited by examiner

MANAGING DATA

BACKGROUND

The transmission and distribution of content over networks has evolved over the years. Users expect a service provider to be able to deliver content in various formats and at various times. Interactive television (iTV) is an example of the evolution of content provisioning services. No longer are users restricted to a passive viewing experience. For example, a game show may provide the television viewing audience an opportunity to buzz in or select a correct answer along with a contestant actually on the set.

Conventional techniques for binding an application (e.g., an iTV application) to video entail adding data or program identifiers (PIDs) to a(n MPEG-2) transport stream or placing the data in a vertical ancillary data space (VANC) or potentially even a vertical blanking interval (VBI) (if the application is small enough). In order to add the data associated with the application to an asset, it may be placed on a carousel. In order to load the application faster at a user equipment device (UED), the application may be "spun" faster, or that is to say, a greater proportion of the data included in the carousel is allocated to application data relative to the underlying content.

Conventional techniques for associating and loading applications have a number of disadvantages. For example, given a particular system configuration and associated bandwidth, "spinning" the carousel faster with respect to the application data may degrade the quality of the underlying content. Moreover, conventional techniques fail to account for the value of the application as a function of time. Service providers are continuing to seek out improved techniques for delivering and loading applications on UEDs.

SUMMARY

This summary is not intended to identify critical or essential features of the disclosure provided herein, but instead merely summarizes certain features and variations thereof.

In some illustrative embodiments, application data may be allocated capacity or bandwidth with respect to a distribution module in accordance with a non-horizontal profile. For example, in some embodiments the application data may be allocated capacity in accordance with a vertical profile. The application data may be bound to audio and/or video data associated with a content asset. The audio/video data and the bound application may be transmitted to one or more devices, such as a user equipment device (UED). In some embodiments, a UED may extract data PIDs from an audio/video transport stream, the application may be loaded from memory, and triggers may be analyzed to determine when various events associated with the application should be executed. In some embodiments, feedback data associated with the use of the audio/video data and/or the application may be analyzed to modify the content asset, the application, or the respective capacity allocated to each.

Other details and features will also be described in the sections that follow.

BRIEF DESCRIPTION OF THE DRAWINGS

Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
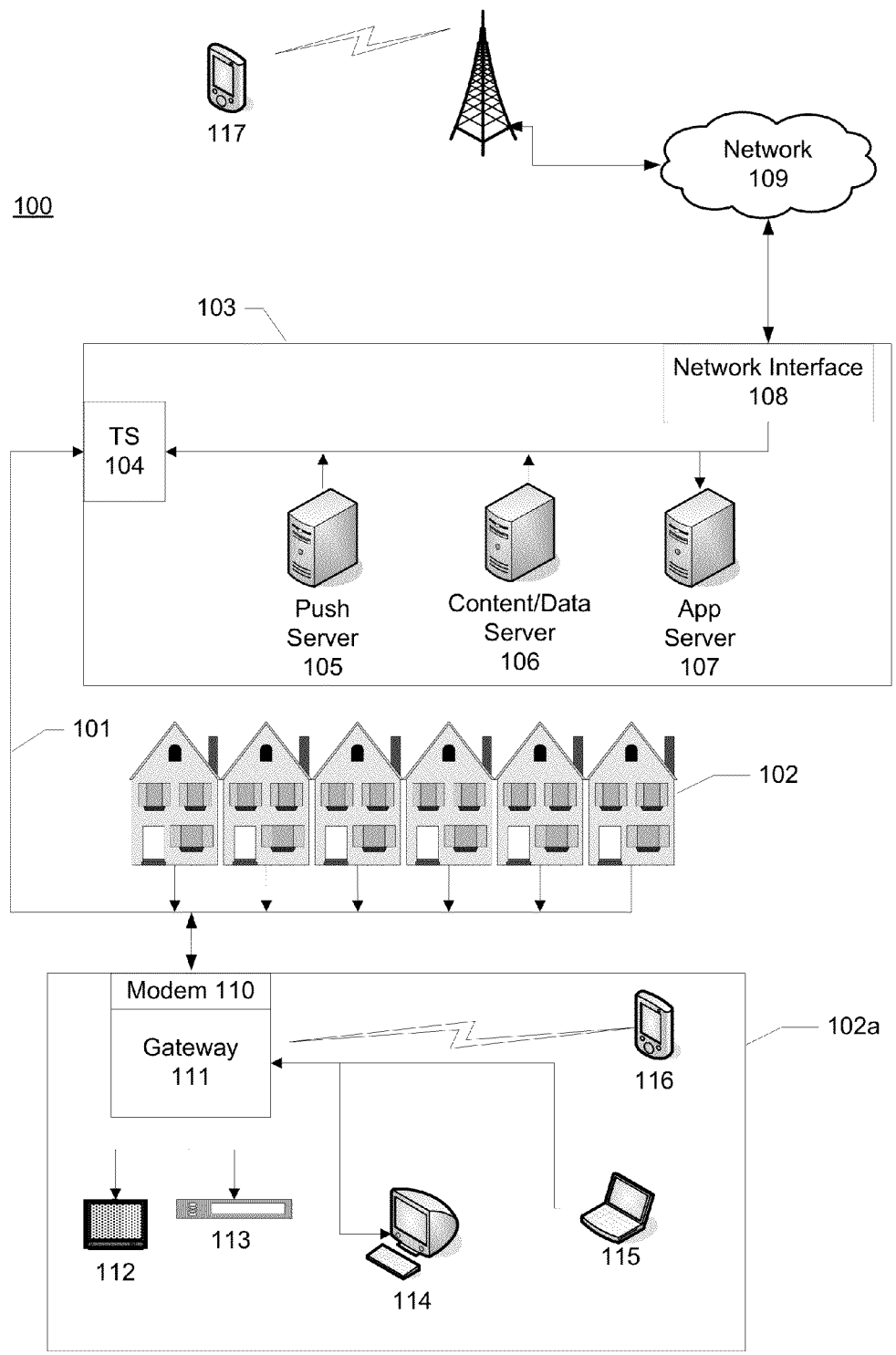
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network or a hybrid fiber/coax (HFC) distribution network. Such networks 100 use a series of interconnected communication lines 101 (e.g., coaxial cables, optical fibers, wireless links, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS) in an HFC-type network, which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS)

standard, published by Cable Television Laboratories, Inc. (a.k.a. CableLabs), or it may be a similar or modified device instead. The termination system (TS) may be configured to place data on one or more downstream frequencies to be received by modems or other user devices at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content and/or data server 106. The content/data server 106 may be one or more computing devices that are configured to provide content to users in the premises 102. This content may be, for example, video on demand movies, television programs, songs, text listings, etc., and/or data such as contact information, address books, and other user information. The content/data server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

Example premises 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired device offering similar functionality. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may comprise a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 902.11), Bluetooth interfaces, and others.

Figure 2:
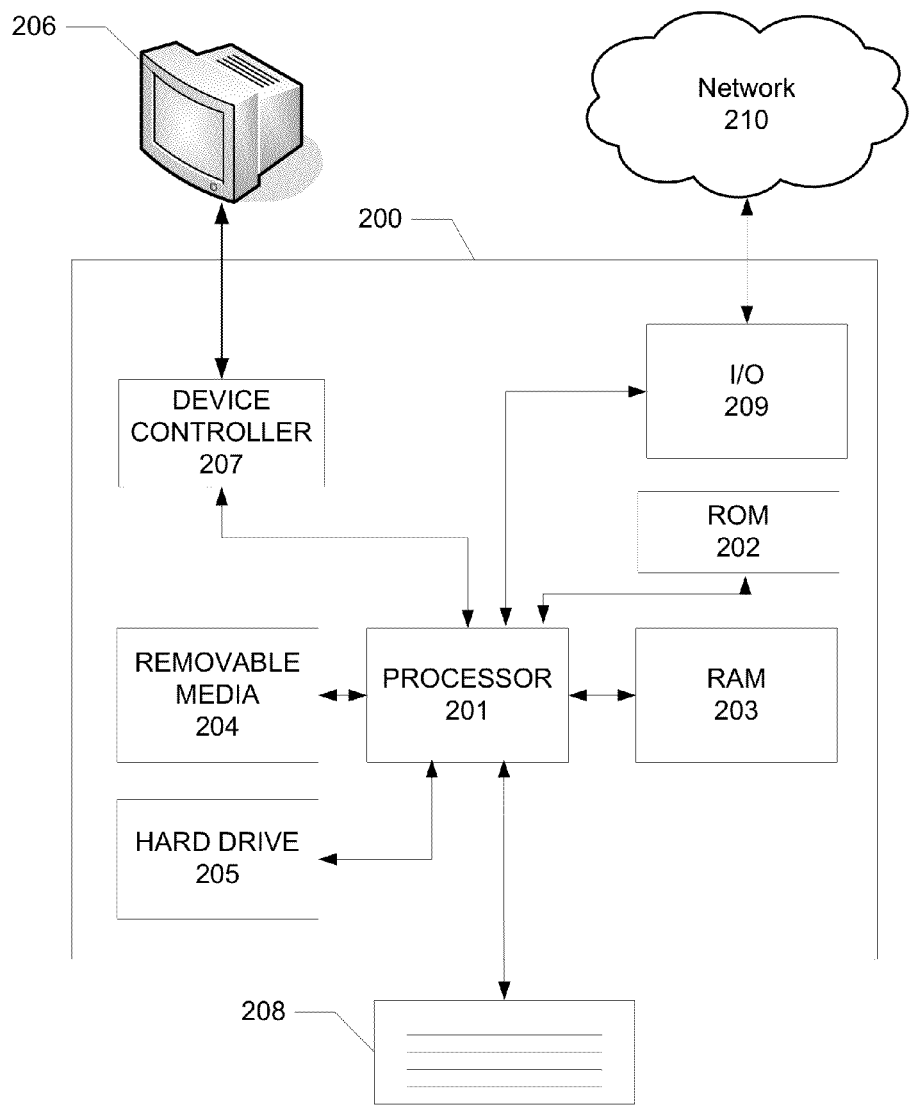
FIG. 2 illustrates an example hardware platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
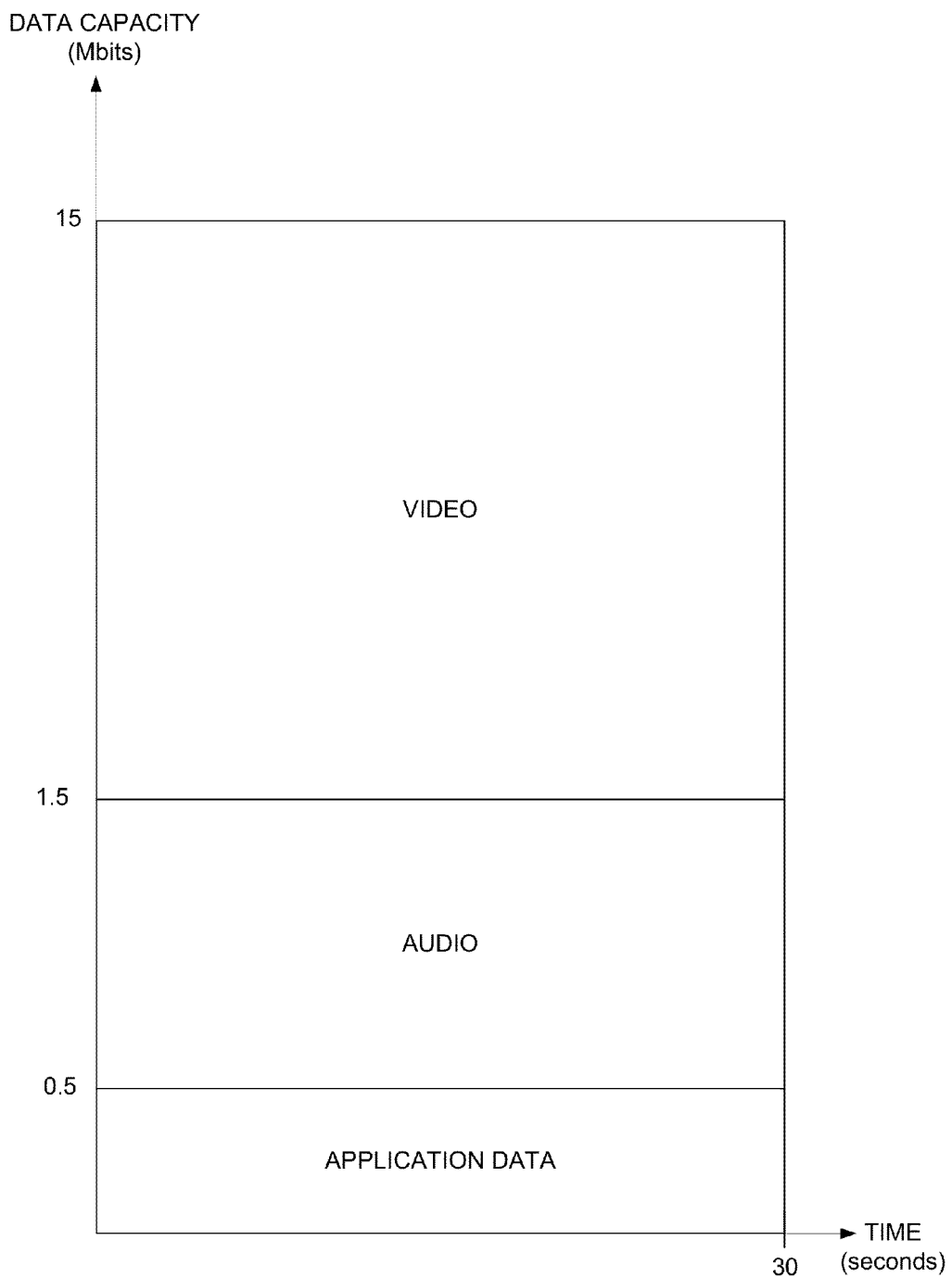
FIGS. 3-5 illustrate distribution profiles in accordance with one or more aspects of this disclosure.

By way of introduction, in conventional systems, application data may be allocated to a content asset in a horizontal fashion. FIG. 3 demonstrates a data distribution profile for a conventional data distribution module. For example, the conventional data distribution module may have an associated transport stream of 15 Mbits for a content asset that is thirty (30) seconds in duration. For purposes of illustration, the content asset may be assumed to be a commercial or advertisement. Of course, any other content asset of any given duration could be used, and the capacity or bandwidth associated with the distribution module may be different in some embodiments.

In FIG. 3, portions of the bandwidth are consumed by application data, audio and video (alternatively, other types of data may instead, or also, occupy portions of the bandwidth). For example, as shown in FIG. 3 (not drawn to scale), over the course of the thirty second advertisement the application data may be allocated 0.5 Mbits of the 15 Mbit transport stream, the audio may be allocated 1 Mbit of the 15 Mbit transport stream, and the video may be allocated 13.5 Mbits of the 15 Mbit transport stream. In other words, in FIG. 3 the application data consumes a constant (or proportional) amount of the capacity or bandwidth associated with the distribution module with respect to the total capacity or bandwidth of the distribution module over the entire duration of the advertisement. Thus, the profile shown in FIG. 3 may be referred to as a "horizontal profile".

Figure 4:
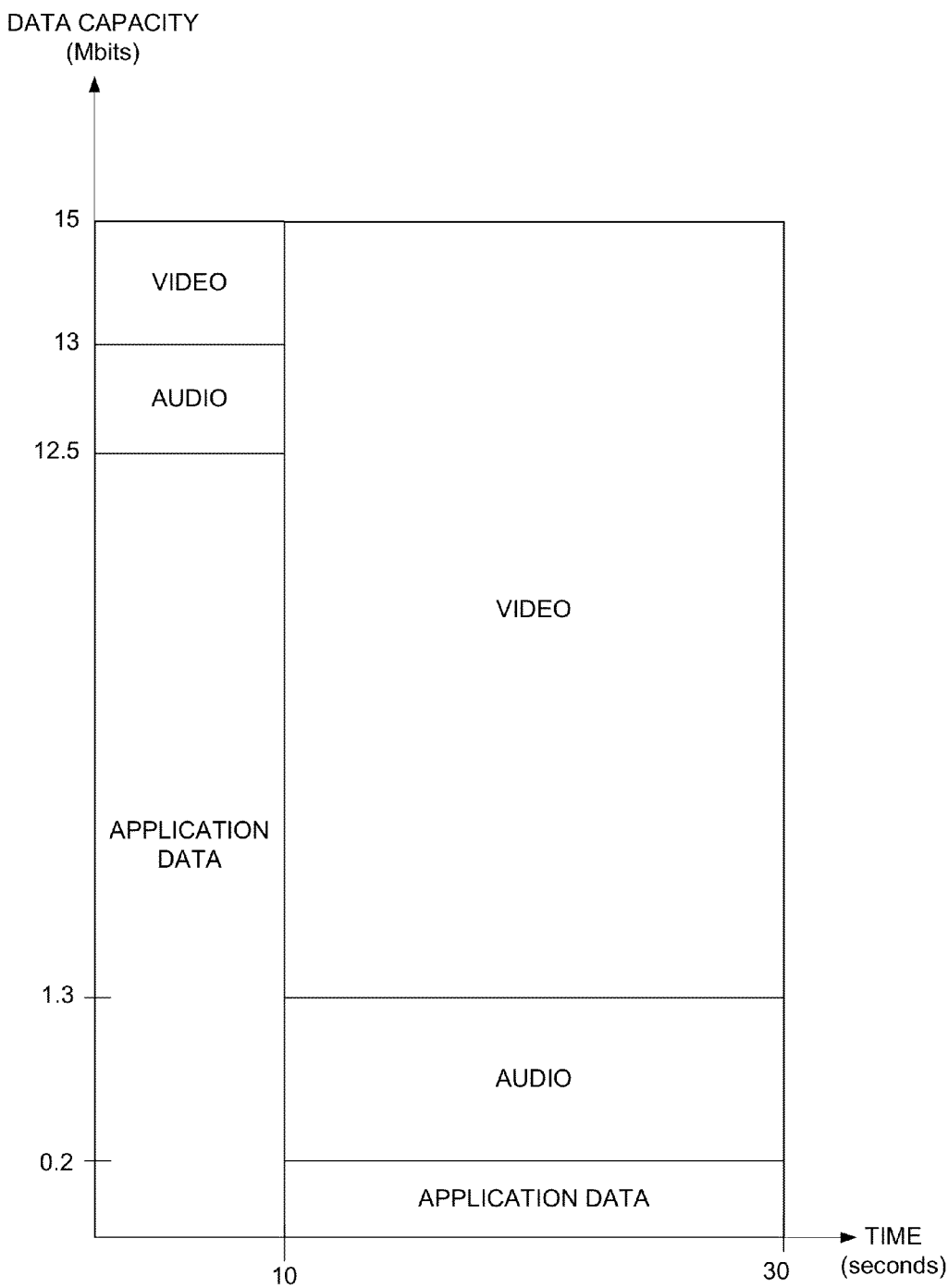

In some embodiments, the distribution profile may be modified from the horizontal profile shown in FIG. 3. An example of such a modified profile is shown in FIG. 4. In FIG. 4, it is assumed that the same content asset (e.g., an advertisement) of the same duration (e.g., 30 seconds) is being referenced relative to the profile shown in FIG. 3 for purposes of facilitating a comparison between the two profiles. In FIG. 4, and during the first ten (10) seconds of the content asset, 12.5 Mbits of the 15 Mbit transport stream may be allocated to application data, 0.5 Mbits of the 15 Mbit transport stream may be allocated to audio, and 2 Mbits of the 15 Mbit transport stream may be allocated to video. Thereafter (e.g., from 10 seconds to 30 seconds), the allocation of application data may be reduced to 0.2 Mbits, the allocation of audio may be increased to 1.1 Mbits, and the allocation of video may be increased to 13.7 Mbits. The profile shown in FIG. 4 may be referred to as a "vertical profile", due to the change or variation in the relative proportion of capacity or bandwidth consumed by the application data incurred at the ten-second point in the content asset.

Relative to the horizontal profile shown in FIG. 3, the profile shown in FIG. 4 may provide for a faster application load on a client device or user equipment device (UED). For example, during the first 10 seconds of the content asset, the application data shown in FIG. 4 consumes 25 times more (12.5 Mbits/0.5 Mbits) of the capacity or bandwidth relative to the application data shown in FIG. 3. All other things being equal, this may result in the application loading at the UED 25 times faster The profile shown in FIG. 4, relative to the profile shown in FIG. 3, may be more conducive from a user perspective as well. For example, assuming that the underlying content asset includes an advertisement for a product or service, users or consumers may be more likely to purchase the product or service at the beginning of the advertisement relative to the end of the advertisement. As such, and assuming that the application data is used to facilitate purchase of the product or service (e.g., by invoking a banner on a display screen over the top of the advertisement that allows the user to purchase the product or service), in some embodiments, it might not make sense to devote capacity or bandwidth to the distribution of the application data towards the end of the advertisement.

Figure 5:
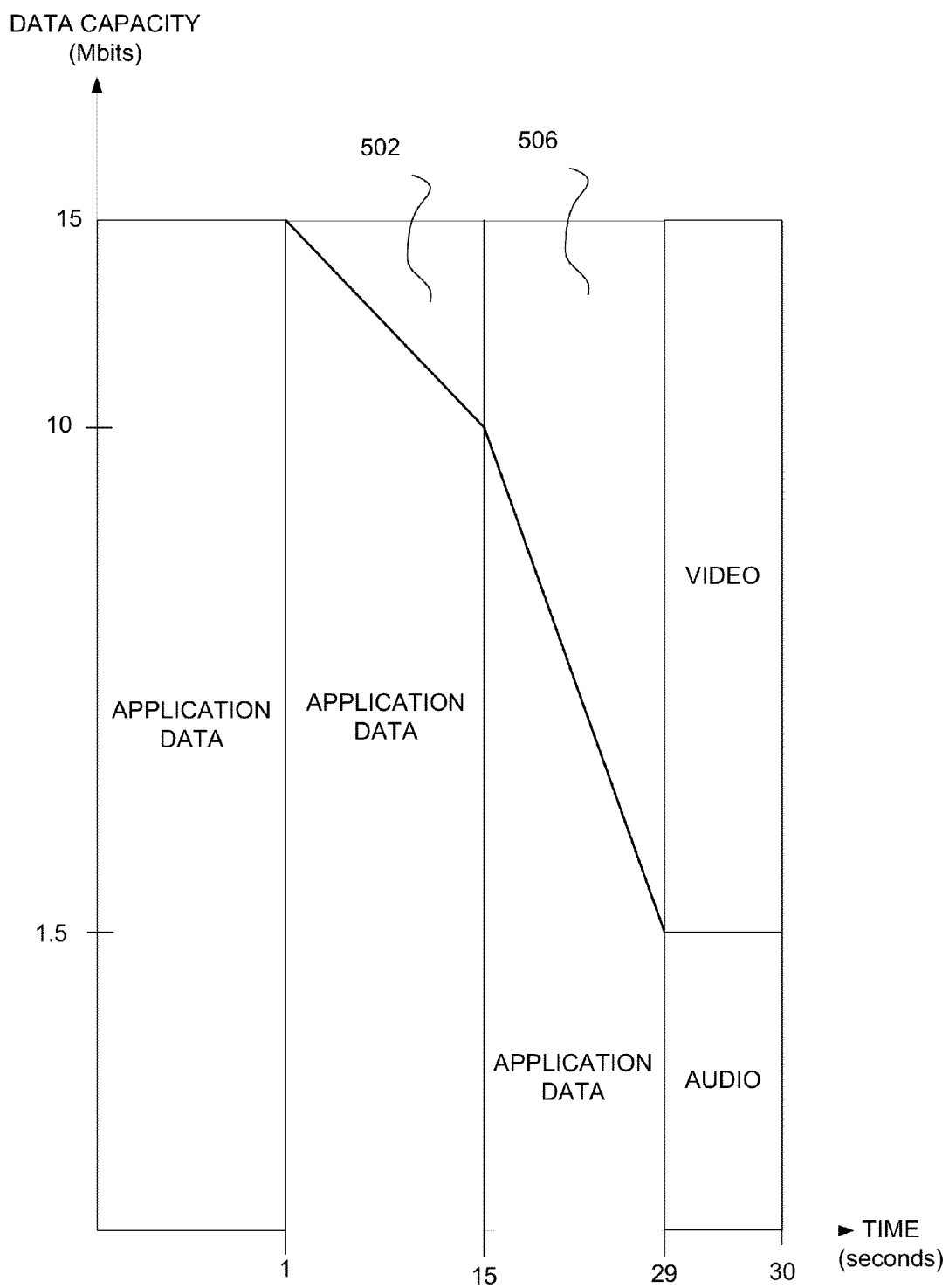

Such a profile is shown in FIG. 5. In FIG. 5, for the first second of the advertisement the application data may consume the entirety of the 15 Mbit capacity. This may be used to ensure that the application is quickly up and running at the UED. Between 1 and 15 seconds, the proportion of the application data may be reduced (e.g., from 15 Mbits to 10 Mbits as shown) relative to the audio and video data, which is shown as group 502 in FIG. 5. Then, from 15 seconds to 29 seconds, the proportion of application data may be further reduced (e.g., from 10 Mbits to 1.5 Mbits as shown) relative to the audio and video data, which is shown as group 506 in FIG. 5. Between 29 and 30 seconds, the application data may be reduced to zero, and the entirety of the capacity may be allocated to audio and video as shown.

The profile shown in connection with FIG. 5 may be referred to as a "non-horizontal profile", in that the application data does not consume a constant (or proportional) capacity or bandwidth for the entire duration of the content asset. However, the profile shown in FIG. 5 includes horizontal and vertical profile aspects. For example, during the first second shown in FIG. 5 the application data consumes 15 Mbits, thus encompassing horizontal profile aspects. Similarly, at 29 seconds the application data vertically changes from 1.5 Mbits to 0 Mbits.

The profiles shown in connection with FIGS. 3-5 are illustrative. In some embodiments the profiles may take on different forms or shapes and may use different numerical values. For example, variations in the proportions of application data relative to video and audio may incorporate non-linear aspects (e.g., second or higher order functions may be used in some embodiments).

While shown as "application data" in FIGS. 3-5, in some embodiments other data types may be taken into consideration or included in connection with the portion of capacity or bandwidth shown with respect to the application data. For example, the other types of data may include electronic programming guide (EPG) data, interactive programming guide (IPG) data (optionally including applications and application data), closed captioning data, etc.

In some embodiments, a content provider or a service operator may dictate how the profile changes over time. For example, in the context of a content asset including an advertisement, the advertisement provider may determine or modify a profile based on marketing data or other studies. In some embodiments, an end-user associated with a UED may select how he/she wants an application to be presented, such as via a depression of a key or button on a remote control device, invoking a selection via one or more menus, etc. The user selection(s) may be transmitted from the UED to a data distribution module (e.g., a data carousel) or some other computing device (e.g., a server) associated therewith, and in response to the user selection(s), the data distribution module or computing device may establish or modify a corresponding profile.

In terms of binding, associating, or otherwise packaging the application data to the content asset, that binding may take place at one or more locations. For example, the binding may take place at the origin of the content (e.g., at a so-called "copy-house" or content provider), and that binding may be referred to as "early binding." An example of a content provider could be any outlet that provides content, such as applications or programs (e.g., computer programs), movies, audio (e.g., music), television programs, any other form of communication (e.g., emails, text messages), cellular, mobile, or satellite communications, multimedia content, copy houses for advertising, studios, etc. Alternatively, or additionally, the binding may take place at a distribution point (e.g., at a central location such as central office 103 of FIG. 1), and that binding may be referred to as "late binding." In some embodiments, the binding may take place at a UED (e.g., at STB 113 of FIG. 1), and that binding may be referred to as "user binding."

Figure 6:
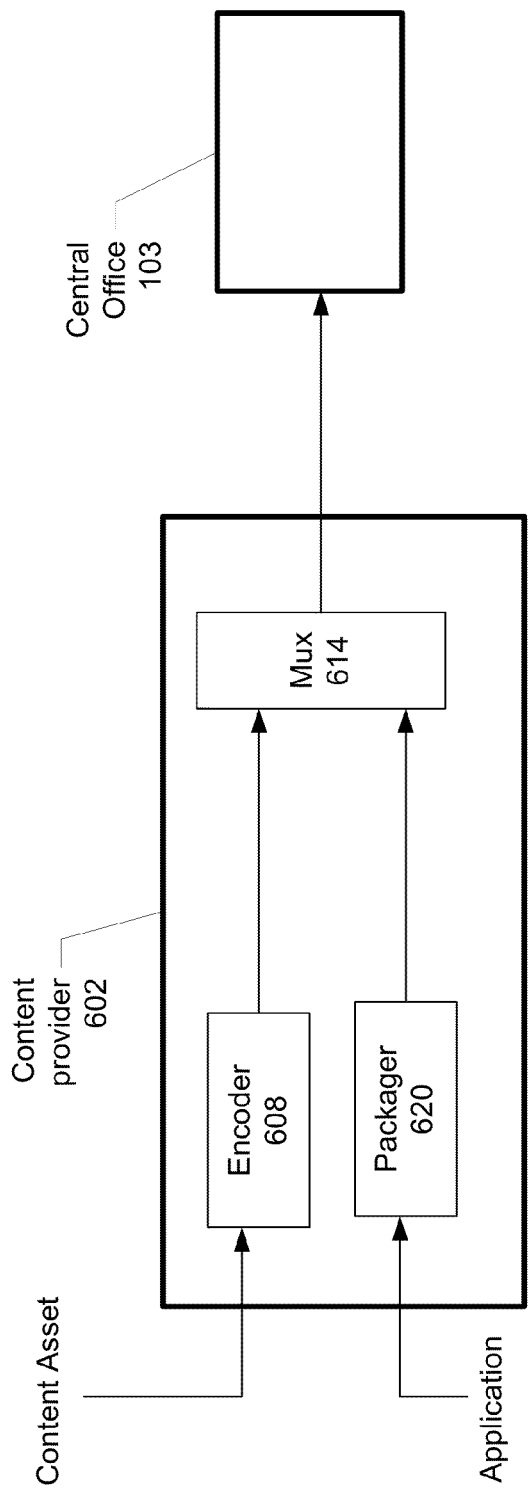
FIGS. 6-8 illustrate example architectures for binding application data to audio/video data in accordance with one or more aspects of this disclosure.

In some embodiments, the choice of what type of binding to use may be based on a variety of factors, such as the type of content asset and a location in which the content asset is going to be displayed, played, used, or consumed, (generally, rendered) optionally using one or more output devices (e.g., display devices and/or audio speakers) associated with a UED. For example, if the content asset includes a game show, and the application data provides an application for allowing a user/viewer to play at the user's location (e.g., the user's home), then early binding may be used by the game show producer in order to protect intellectual property rights associated with the presentation of the game show and in order to promote consistency for all viewings. On the other hand, if the content asset includes a U.S. presidential speech, then late binding may be used to tailor the application to a geographic location in which the speech will be displayed. For example, if a user equipment device is located in Texas, then a service provider associated with a distribution point might emphasize in the application data those portions of the speech related to gun control laws, whereas if the user equipment device is located in New York, then the service provider might emphasize in the application data those portions of the speech related to finance or the economy. If the content asset relates to children's programming, such as cartoons, user binding may be used to reinforce educational aspects of the programming based on a child's current rate of learning, thereby providing a high degree of individualized customization of the application presented in conjunction with the programming FIG. 6 illustrates an architecture that may be used to facilitate early binding. In particular, FIG. 6 illustrates a content provider 602 that may receive a content asset and an application (optionally in the form of application data). The content asset may be received via one or more mediums. For example, the content asset may be stored on a CD or a tape, received via an electronic transmission, wirelessly, etc. The content asset may be played using, e.g., a deck (not shown in FIG. 6), the output of which would feed an encoder 608 configured to encode the content asset. The output of encoder 608 may serve as an input to a multiplexer (mux) 614. The application may be prepared using one or more tool sets (e.g., OpenCable Application Platform (OCAP), Enhanced TV Binary Interchange Format (EBIF), etc.) and may be provided to content provider 602, and more specifically, a packager 620 that may be configured to stream application data to mux 614. In some embodiments, packager 620 may be configured to convert source code (e.g., iTV source code) into one or more streams (e.g., a byte stream) that can be muxed to a transport stream. Mux 614 may be configured to combine the (encoded) audio/video output of encoder 608 with the application data output of packager 620, thereby achieving a binding of the application data to the content asset data (e.g., audio/video). Mux 614 may be configured to generate a file of the combined application data with the content asset data, which may be transmitted to central office 103 (or some other location) for further distribution.

Figure 7:
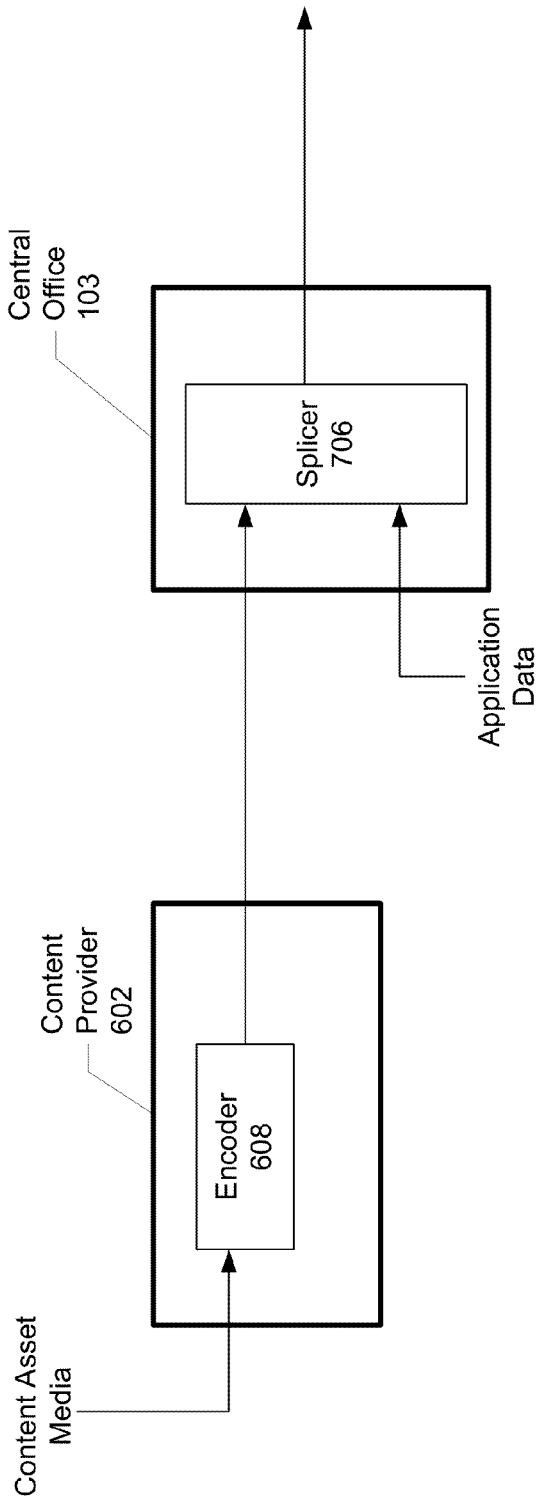

FIG. 7 illustrates an architecture that may be used to facilitate late binding. Relative to FIG. 6, FIG. 7 performs a binding or combination of the application data with (encoded) content asset data (which may be output from encoder 608 in FIG. 7) at central location 103 via a splicer 706. Splicer 706 may generate data content and output that data content suitable for transmission in accordance with one or more communication protocols or standards.

In some embodiments, splicer 706 may include components or circuitry similar to mux 614 shown in FIG. 6. In some embodiments, central location 103 may receive a selection of a content asset and/or an application from a UED, and in response to the selection, central location 103 may select a content asset or content asset data (e.g., audio/video) and/or one or more applications or application data to bind at splicer 706. Alternatively, or additionally, the selections may be conveyed further upstream to content provider 602 to facilitate the selection of content asset(s) and application(s), or binding the two together at content provider 602.

In user binding, a combination of content asset data and application data may occur at a UED, such as at a computer, a gateway, a set top box, a mobile device, etc. In some embodiments, components or circuits similar to mux 614 and splicer 706 may be included in the UED to achieve the user binding. When the binding is done at a UED, an assumption may be made that the new application will fit within a space or capacity allocated during a video compression. For example, if during a video compression phase 300 kbits are reserved in a first frame in the form of an early bound application or null packets, late binding might only be able to replace 300 kbits in the first frame. In some embodiments, an asset may be re-encoded to reallocate or shift an amount of capacity available to one or more of the asset and the application.

Figure 8:
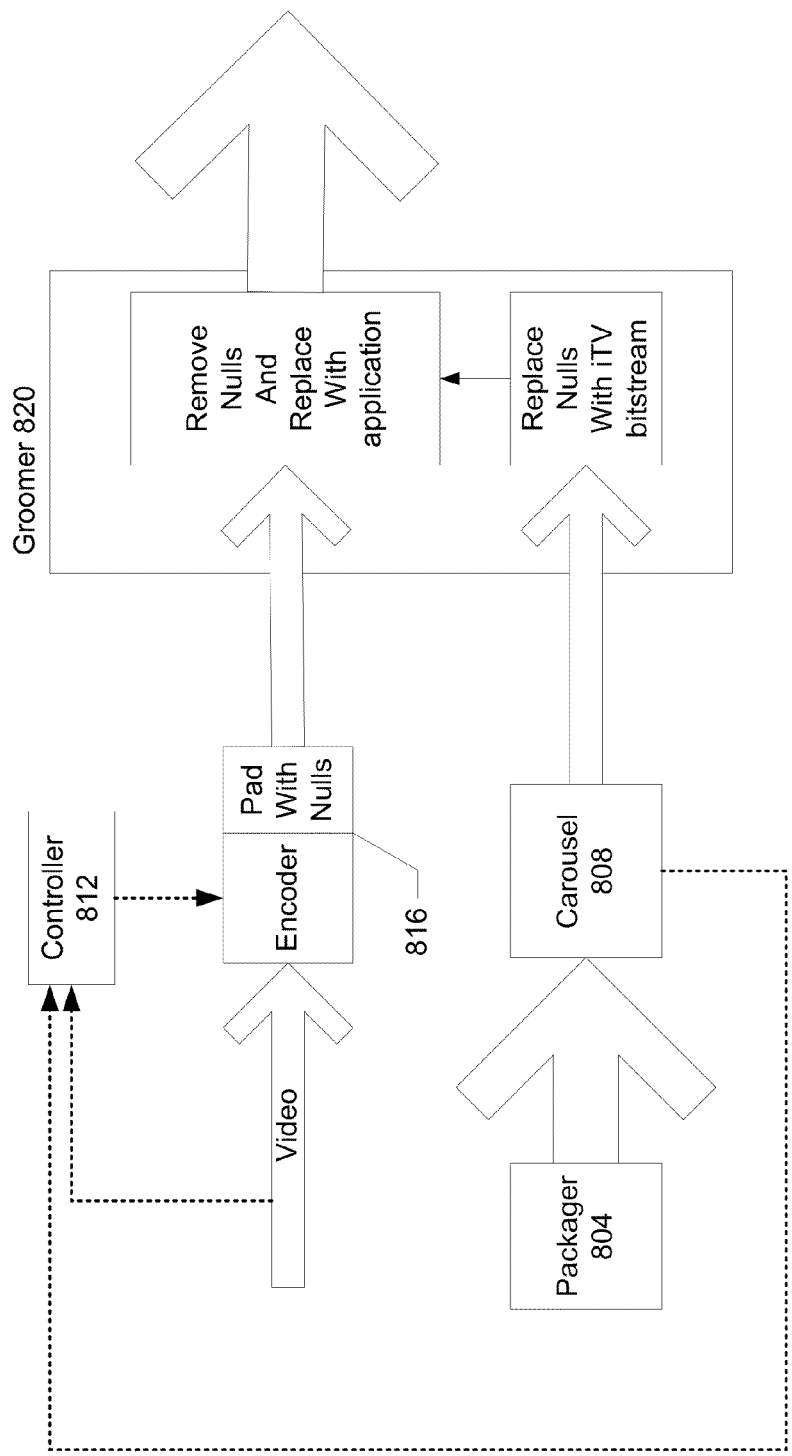

FIG. 8 illustrates another architecture that may be used to bind content asset data and application data. A packager 804 (which may include components or devices, and/or may provide functionality similar to packager 620 of FIG. 6) may generate and provide an application (such as an iTV application) to a carousel 808 (as shown via the arrow coupling packager 804 to carousel 808). Carousel 808 may characterize the application and provide those characteristics (optionally in the form of information or data) to a controller 812 (as shown via the line coupling carousel 808 and controller 812). Controller 812 may receive the application characteristics and video characteristics (optionally in the form of information or data) associated with video (as shown via the line coupling "video" to controller 812) and set a bit rate per frame to be associated with the video (as shown via the line coupling controller 812 to an encoder 816). Based on the bit rate provided by controller 812 and the input video, encoder 816 (which may include components or devices, and/or may provide functionality similar to encoder 608 of FIGS. 6-7) may encode the input video and pad the (encoded) video with nulls, generating padded video (as shown via the arrow coupling encoder 816 to a groomer 820). Groomer 820 may receive the padded video from encoder 816 and a bitstream from carousel 808 (as shown via the arrow coupling carousel 808 to groomer 820) and may generate enhanced video at the output of groomer 820 (as shown via the output arrow from groomer 820). As part of the enhanced video generation, groomer 820 may replace nulls with a(n application) bitstream, using that bitstream to replace nulls in the video that were padded via encoder 816 as shown in FIG. 8.

In some embodiments, the different types of bindings may be combined. For example, early binding may be used to provide a default set of data values to support an application, and those default values may be overridden via one or more of late binding and user binding. Moreover, aspects, components, and/or devices of the various architectures described herein may be combined in some embodiments.

Figure 9:
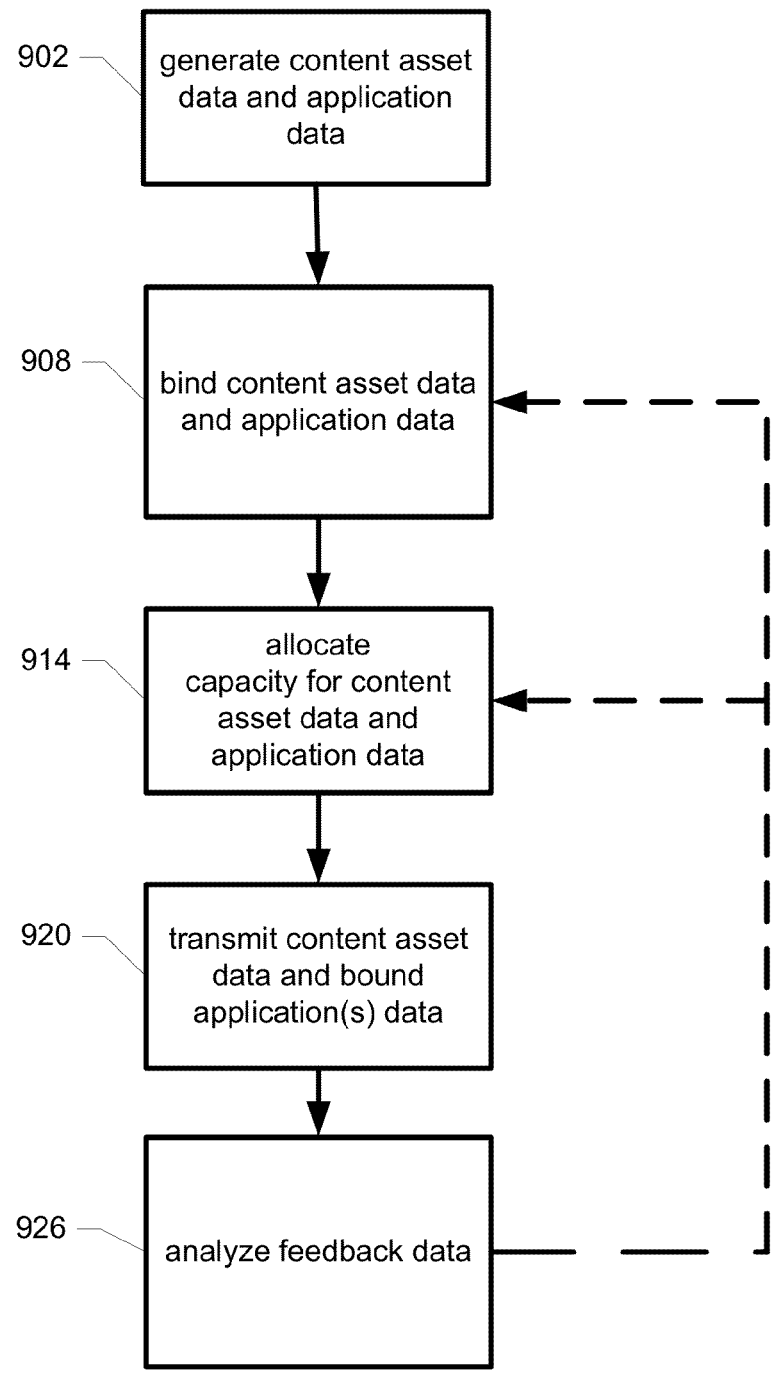
FIG. 9 illustrates a method in accordance with one or more aspects of this disclosure.

FIG. 9 illustrates a method that may be used in connection with one or more of the architectures described herein. In step 902, content asset data (e.g., audio/video data) associated with a content asset and application data may be generated. The content asset data and/or application data may be generated by, or received from, a content source, a service provider, a network operator, a third party, etc., using one or more recording mediums and one or more tool suites.

In step 908, the application data may be bound to the content asset data. For example, one or more of early binding, late binding, and user binding may be performed to associate the content asset data with the application data. The binding of step 908 may be in response to a user selection of a content asset or an application in some embodiments.

In step 914, a capacity for the content asset data and application data may be allocated. The allocated capacity may be a function of the total capacity or bandwidth available in a given system, the processing power or capabilities associated with various devices in the system, the load in the system, or other criteria. As part of allocating capacity, a profile similar to the profiles shown in connection with FIGS. 3-5 (or any other profile) may be generated or realized.

In step 920, the content asset data with the bound application(s) data may be transmitted to one or more devices, such as a distribution module (e.g., a router), a UED, etc. In some embodiments, the transmission associated with step 920 may take place automatically or in accordance with a schedule. Alternatively, in some embodiments a user may take some specified action with respect to a content asset or an application in order to prompt the transmission.

In step 926, feedback data may be analyzed or examined. The feedback data may relate to the use of the application(s) in conjunction with the content asset. Based at least in part on the analysis of the feedback data, one or more actions may take place. For example, if the content asset includes an advertisement, and there has been little to no purchase orders for the advertised product or service, the method may loop-back to step 914 to increase the allocated capacity for the application data relative to the content asset data in an effort to increase sales. Similarly, if an analysis of the feedback data indicates that users are initially selecting to purchase the advertised product or service, only to cancel their orders when presented with a payment display screen associated with the application, the method may loop-back to step 908 to bind an improved and less confusing payment display screen associated with the content asset data. Similarly, the method may loop-back in response to an affirmative user selection to do so, such as a user requesting a second or different application by depressing a button or widget associated with a first application.

While discussed above in the context of binding applications to a content asset, in some embodiments the relationship may be reversed, e.g., a content asset may be bound to one or more applications. When binding applications to a content asset, a UED may extract data PIDs from, e.g., an audio/video transport stream, the application may be loaded from memory, and triggers may be analyzed to determine when various events associated with the application should be executed. When binding a content asset to an application, the intelligence or drivers may be embedded in, or reside within, the application for driving an audio/video presentation—for example, a widget may be included on a web page that, when selected, causes the retrieval and playback of audio/video content.

Aspects of this disclosure may readily be applied to, and adapted to be operative on, one or more communication systems. Those communication systems may include computer networks, television networks, satellite networks, telephone and cellular networks, and the like. Moreover, in some embodiments the communication systems (and the devices and components included therewith) may communicate with one another in accordance with one or more communication protocols or standards. For example, IP Multimedia Subsystem (IMS) is a general-purpose, open industry standard for voice and multimedia communications over packet-based IP networks. IMS may serve as a foundation for technologies like voice over IP (VoIP), push-to-talk (PTT), push-to-view, video calling, and video sharing. IMS may be based on the session initiation protocol (SIP). For users, IMS-based services may enable person-to-person and person-to-content communications in a variety of modes, including voice, text, pictures, and video, or any combination of these—in a highly personalized and controlled way.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As discussed herein, a content asset or an application may be distributed to intermediary/network components and client-side devices at various times and in various formats. The distribution and transmission techniques described herein may leverage existing components and infrastructure to minimize power dissipation, operational complexity, footprint size, and management involvement, amongst other factors and costs.

The methodological acts and processes may be tied to particular machines or apparatuses. For example, as described herein, a content asset or an application may be distributed to a user location via one or more computing devices (e.g., servers) and that content asset or application may be displayed, played, used, or consumed at the user location via one or more UEDs and/or display devices. The content may be formatted in accordance with one or more transmission techniques, types, or protocols, such as via broadcast and narrowcast distribution models. More generally, one or more computers may include one or more processors and memory storing instructions, that when executed, perform the methodological acts and processes described herein. Furthermore, the methodological acts and processes described herein may perform a variety of functions including transforming an article (e.g., content asset data and/or application data) into a different state or thing (e.g., content asset data and/or application data that is distributed in accordance with a "non-horizontal" profile).

In some embodiments, a control plane may be used to control a flow or transfer of information or data. The control plane may provide logic and control for video/audio compression and insertion of variable bit rate (VBR) application data. In some embodiments the control plane may control or command a carousel (e.g., carousel 808 of FIG. 8) to generate VBR streams. In some embodiments the control plane may generate and send a constant bit rate (CBR) stream from a carousel (e.g., carousel 808 of FIG. 8) to a groomer (e.g., groomer 820 of FIG. 8). Then the groomer may accept a VBR stream, or convert the CBR stream into a VBR application data stream, as it creates the CBR (or a capped VBR) transport stream. In some embodiments, space may be reserved for inserting the application data, which may be a function of a video compression phase of the workflow. The reservation of space during video and audio compression may be the responsibility of the control plane in some embodiments. In some embodiments a VBR application stream may be packaged with video and/or audio for delivery to a terminal device (e.g., an iTV enabled terminal).

In some embodiments, the control plane may comprise one or more processors and memory storing instructions that, when executed by the one or more processors, perform one or more of the methodological acts described herein. In some embodiments, the control plane may comprise metadata passed to an apparatus, architecture, or system to facilitate the control or flow of data or information. For example, the metadata may be used to facilitate binding operations or an allocation of capacity in some embodiments. In some embodiments, the control plane may be located at or within one or more locations or devices. For example, the control plane may be located at content provider 602 or central office 103 of FIGS. 6 and 7 (or any of the devices located in content provider 602 or central office 103). In some embodiments, the control plane may be located in one or more of the entities shown in FIG. 8 (e.g., packager 804, carousel 808, controller 812, encoder 816, groomer 820).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
allocating, based on a duration of a content asset, capacity in a transmission for each of application data and content asset data associated with the content asset, wherein the application data is allocated a first proportion of the capacity in the transmission during a first segment of the content asset and a second proportion of the capacity in the transmission during a second segment of the content asset, the first proportion different from the second proportion; and
transmitting, from a server, the content asset data and the application data based at least in part on the allocated capacity in the transmission.

2. The method of claim 1, further comprising binding the application data to the content asset data.

3. The method of claim 1, further comprising binding the application data to the content asset data at a user equipment device receiving the transmission.

4. The method of claim 1, wherein the content asset data comprises at least one of audio data and video data, and wherein the content asset comprises an advertisement, and wherein the application data comprises an interactive television (iTV) application bound to the advertisement.

5. The method of claim 1, further comprising:
receiving feedback data based on a use of at least one of the transmitted content asset data and the transmitted application data;
modifying the at least one of the content asset data and the application data based at least in part on the feedback data; and
transmitting the modified at least one of the content asset data and application data.

6. The method of claim 5, wherein modifying the at least one of the content asset data and the application data comprises selecting new application data based an analysis of the feedback data.

7. The method of claim 6, wherein the new application data comprises a different version of the application data.

8. The method of claim 1, wherein the first proportion is greater than the second proportion and the first segment occurs prior to the second segment during the duration of the content asset.

9. The method of claim 1, wherein the first segment coincides with a beginning of the content asset and the first proportion is greater than the second proportion.

10. The method of claim 1, wherein the content asset is an advertisement and the application data provides an interactive television (iTV) application bound to the advertisement, and wherein allocating capacity in the transmission comprises:
allocating, based on the duration of the advertisement, a greater proportion of the capacity to the application data during a beginning portion of the advertisement than during an end portion of the advertisement.

11. The method of claim 1, further comprising:
receiving feedback data based on a use of at least one of the transmitted content asset data and the transmitted application data;
modifying the allocated capacity for the application data based at least in part on the feedback data; and
transmitting the content asset data and application data according to the modified capacity.

12. A method comprising:
determining, at a server and based on a duration of a content asset, a distribution profile for application data and content asset data associated with the content asset, wherein the distribution profile indicates that the application data comprises a first proportion of a transmission at a first time during the duration and a second proportion of the transmission at a second time during the duration, the first proportion different from the second proportion; and
transmitting, from the server, the content asset data and the application data in accordance with the distribution profile.

13. The method of claim 12, wherein the distribution profile comprises a vertical profile.

14. The method of claim 12, wherein the distribution profile comprises a non-linear profile.

15. The method of claim 12, wherein the distribution profile comprises a non-horizontal profile.

16. The method of claim 12, further comprising:
receiving feedback data based on a use of at least one of the transmitted content asset data and the transmitted application data;
modifying the distribution profile for the application data based at least in part on the feedback data; and
transmitting the content asset data and application data according to the modified distribution profile.

17. The method of claim 16, wherein modifying the distribution profile for the application data comprises increasing the first proportion of the transmission consumed by the application data.

18. The method of claim 12, wherein the first time coincides with a beginning of the content asset and the first proportion is greater than the second proportion.

19. The method of claim 18, wherein the distribution profile indicates that the application data comprises the first proportion of the transmission during an initial period of time and the second proportion during a remaining period of time, the initial period of time including the beginning of the content asset.

20. The method of claim 12, wherein the first proportion comprises all of the transmission during a first portion of the duration of the content asset, the first portion comprising a beginning of the content asset, and wherein the second proportion comprises none of the transmission during a second portion of the duration of the content asset, the second portion comprising an end of the content asset.

21. A method comprising:
   allocating capacity in a transmission over a period of time for application data, wherein the capacity is allocated using a distribution profile that indicates how a proportion of the transmission allocated to the application data varies over a duration of a content asset associated with the application data; and
   transmitting the application data according to the allocated capacity.

22. The method of claim 21, wherein the distribution profile indicates that the application data comprises a first proportion of the transmission at a first time and a second proportion of the transmission at a second time, the first proportion different from the second proportion.

23. The method of claim 22, wherein the first proportion is greater than the second proportion and the first time occurs prior to the second time during the duration of the content asset.

24. The method of claim 21, further comprising:
   receiving feedback data based on a use of the transmitted application data;
   modifying the distribution profile for the application data based at least in part on the feedback data; and
   transmitting the application data according to the modified distribution profile.

* * * * *